United States Patent [19]

Koyama et al.

[11] Patent Number: 5,153,038
[45] Date of Patent: Oct. 6, 1992

[54] PLASTIC MULTI-LAYER VESSEL

[75] Inventors: Masayasu Koyama, Zushi; Yasuhiro Oda, Yokohama; Muneki Yamada, Fujisawa, all of Japan

[73] Assignee: Toyo Seikan Kaisha, Ltd., Tokyo, Japan

[21] Appl. No.: 459,813

[22] PCT Filed: Apr. 27, 1989

[86] PCT No.: PCT/JP89/00449
§ 371 Date: Apr. 5, 1990
§ 102(e) Date: Apr. 5, 1990

[87] PCT Pub. No.: WO89/10261
PCT Pub. Date: Nov. 2, 1989

[30] Foreign Application Priority Data

Apr. 30, 1988 [JP] Japan .................. 63-105446
Apr. 30, 1988 [JP] Japan .................. 63-105447

[51] Int. Cl.⁵ .................. B32B 27/04; B32B 27/08
[52] U.S. Cl. .................. 428/35.8; 428/35.9; 428/36.6; 428/36.7; 428/520; 428/522; 428/913; 252/188.28
[58] Field of Search .................. 428/36.6, 36.7, 35.8, 428/35.9, 522, 520, 913; 252/188.28; 523/200, 215, 216, 217, 515; 524/204, 260, 202, 90

[56] References Cited

U.S. PATENT DOCUMENTS 4,048,361  9/1977  Valyi .................. 428/35
4,407,897 10/1983  Farrell et al. .................. 428/36.7
4,425,410  1/1984  Farrell et al. .................. 428/36.7
4,536,409  8/1985  Farrell et al. .................. 428/36.7
4,886,618 12/1989  Novak .................. 252/188.28
5,055,328 10/1991  Evert .................. 428/520

FOREIGN PATENT DOCUMENTS 56-159166 12/1981  Japan .

Primary Examiner—Ellis P. Robinson
Assistant Examiner—Rena L. Dye
Attorney, Agent, or Firm—Sughrue, Mion, Zinn, Macpeak & Seas

[57] ABSTRACT

In a plastic multi-layer vessel, by forming a layer of a resin composition formed by incorporating an oxygen scavenger, optionally with a water-absorbing agent, in a gas barrier resin, a combination layer comprising a layer of a gas barrier thermoplastic resin and a layer of a resin composition formed by incorporating an oxygen scavenger in a moisture-absorbing thermoplastic resin, or a combination layer comprising a layer of a resin composition formed by incorporating an oxygen scavenger into a gas barrier resin and a layer of a resin composition formed by incorporating an water-absorbing agent into a thermoplastic resin, the resistance against the permeation of oxygen under heat sterilization conditions and after the heat sterilization can be highly improved, and the quantity of oxygen in the vessel can be controlled to a very low level.

24 Claims, 2 Drawing Sheets

PLASTIC MULTI-LAYER VESSEL

This is a continuation of PCT Application PCT/JP88/00449, filed Apr. 27, 1989.

DESCRIPTION

1. Technical Field

The present invention relates to a plastic multi-layer vessel, in which under conditions where water and heat act, that is, under heat sterilization conditions, and after the heat sterilization, the resistance against permeation of oxygen is very high and the amount of oxygen in the vessel is controlled to a very low level.

2. Background Art

Metal cans, glass bottles and various plastic vessels have heretofore been used as the packaging vessel, and in view of the light weight and high impact resistance and because of the low manufacturing cost, plastic vessels are widely used in various fields.

In case of a metal can or glass bottle, the amount of oxygen permeating into the vessel through the vessel wall is zero, but in case of a plastic vessel, the amount of oxygen permeating into the vessel through the vessel wall cannot be neglected and a problem rises by this permeation of oxygen with respect to the preservability of the content.

In order to solve this problem, there is adopted a method in which a multi-layer structure is imparted to a wall of a plastic vessel and a resin having a resistance against permeation of oxygen, such as an ethylene/vinyl alcohol copolymer, is used for at least one layer of this multi-layer structure.

An oxygen scavenger has been used from old for removing oxygen from the interior of a vessel, and a example of application of this oxygen scavenger to a vessel wall is disclosed in Japanese Examined Patent Publication No. 62-1824, and according to this known technique, a layer formed by incorporating an oxygen scavenger comprising a reducing agent as the main component into a resin having an oxygen permeability is laminated on a layer having an oxygen gas barrier property to form a packaging multi-layer structure.

An oxygen barrier resin such as an ethylene/vinyl alcohol copolymer is sensitive to the moisture, and the oxygen permeability tends to increase with adsorption of the moisture. As means for obviating this disadvantage, Japanese Unexamined Patent Publication No. 57-170748 discloses a method in which a resin layer in which a moisture-absorbing agent is incorporated is disposed in proximity to an ethylene/vinyl alcohol copolymer layer in a multi-layer plastic vessel, and Japanese Unexamined Patent Publication No. 61-11339 discloses a method to which a layer of a dispersion of highly water-absorbing resin particles in a thermoplastic resin medium is interposed between such gas barrier layer and moisture-resistant resin layer.

According to these prior techniques, the oxygen scavenger present in the vessel wall absorbs oxygen in the vessel to maintain a highly oxygen-free state in the vessel. However, when a plastic vessel which does not possess a completely oxygen-intercepting property as possessed by a metal foil or the like is placed under conditions in which water and heat simultaneously act, that is, under heat sterilization conditions, oxygen permeating through the vessel wall cannot be controlled to a low level.

In general, an oxygen barrier resin such as an ethylene/vinyl alcohol copolymer has a moisture-absorbing property and has such a property that the oxygen permeation coefficient increases with absorption of the moisture. Accordingly, there is ordinarily adopted a multi-layer structure in which inner and outer layers composed of a moisture-resistant resin such as an olefin resin are disposed on both the sides of an intermediate layer composed of an oxygen barrier resin. Under the above-mentioned conditions where water and heat simultaneously act, permeation of water through the olefin resin layer is caused, and by increase of the oxygen gas permeability in the oxygen barrier resin layer by absorption of the moisture and by increase of the oxygen permeability by elevation of the temperature, it is considered that the amount of oxygen in the vessel increases. According to another prior art, a moisture-absorbing and water-absorbing agent is incorporated in a layer of a resin having a water-absorbing property, such as an ethylene/vinyl alcohol copolymer, or a layer of a resin containing this moisture-absorbing and water-absorbing agent is arranged in proximity to the water-absorbing resin layer. According to this technique, there can be attained an effect of controlling increase of the oxygen permeability by absorption of the moisture, by scavenging water permeating through the plastic wall at the heat sterilization, but no substantial controlling effect is attained to the increase of the permeation quantity of oxygen during the heat sterilization by elevation of the temperature.

DISCLOSURE OF THE INVENTION

It is an object of the present invention to provide a plastic multi-layer vessel in which the above-mentioned problems involved in the conventional plastic multi-layer vessels are solved, and the permeation of oxygen through the vessel wall is controlled to a very low level under conditions where water and heat simultaneously act and with the lapse of time after the exposure to these conditions, and the quantity of oxygen in the vessel is reduced.

In accordance with a first embodiment of the present invention, there is provided a plastic multi-layer vessel having a laminate structure comprising an intermediate layer composed of a resin composition formed by incorporating an oxygen scavenger into a gas barrier thermoplastic resin having an oxygen permeation coefficient smaller than $10^{-12}$ cc.cm/cm$^2$.sec.cmHg as measured at a temperature of 20° C. and a relative humidity of 0% and a water absorption larger than 0.5% as measured at a temperature of 20° C. and a relative humidity of 100%, and moisture-resistant thermoplastic resin layers arranged on both the sides of said intermediate layer.

In accordance with a second embodiment of the present invention, there is provided a plastic multi-layer vessel having a laminate layer structure comprising a first intermediate layer of a gas barrier thermoplastic resin having an oxygen permeation coefficient smaller than $10^{-12}$ cc.cm/cm$^2$.sec.cmHg as measured at a temperature of 20° C. and a relative humidity of 0%, a second intermediate layer composed of a resin composition formed by incorporating an oxygen scavenger into a moisture-absorbing thermoplastic resin having a water absorption larger than 0.5% as measured at a temperature of 20° C. and a relative humidity of 100%, and moisture-resistant thermoplastic resin layers arranged on both the sides of the intermediate layers.

In accordance with a third embodiment of the present invention, there is provided a plastic multi-layer vessel which comprises a layer composed of a resin composition formed by incorporating an oxygen scavenger and a water-absorbing agent into a gas barrier resin having an oxygen permeation coefficient smaller than $10^{-12}$ cc.cm/cm$^2$.sec.cmHg as measured at a temperature of 20° C. and a relative humidity of 0% and a water absorption larger than 0.5% as measured at a temperature of 20° C. and a relative humidity of 100%.

In accordance with a fourth embodiment of the present invention, there is provided a plastic multi-layer vessel comprising (A) a layer of a resin composition formed by incorporating an oxygen scavenger into a gas barrier resin having an oxygen permeation coefficient smaller than $10^{-12}$ cc.cm/cm$^2$.sec.cmHg as measured at a temperature of 20° C. and a relative humidity of 0% and a water absorption larger than 0.5% as measured at a temperature of 20° C. and a relative humidity of 100% and (B) a layer of a resin composition formed by incorporating a water-absorbing agent into a thermoplastic resin.

It is preferred that the oxygen scavenger be incorporated in an amount of 1 to 1000% by weight based on the resin in which the oxygen scavenger is incorporated and the water-absorbing agent be incorporated in an amount of 1 to 300% by weight based on the resin in which the water-absorbing agent is incorporated.

BEST MODE FOR CARRYING OUT THE INVENTION

Figure 1:
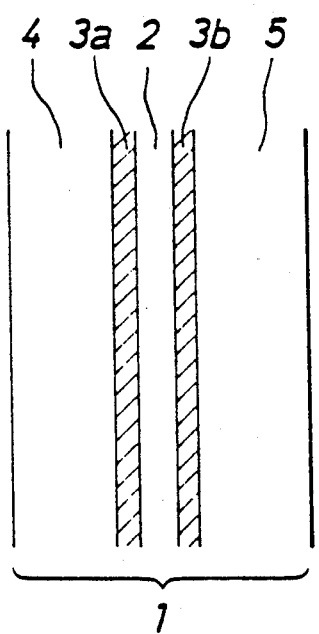
FIGS. 1 through 5 are sectional views showing examples of the multi-layer structure of the vessel of the present invention.

In the multi-layer vessels according to the first and second embodiments of the present invention, a gas barrier resin is used as the intermediate layer and moisture-resistant resin layers are arranged on both the sides of the intermediate layer, as in case of the conventional multi-layer vessels.

In the multi-layer vessels according to the third and fourth embodiments of the present invention, an oxygen scavenger is incorporated in combination with a water-absorbing agent into a moisture-absorbing gas barrier resin, or a layer of a gas barrier resin in which an oxygen scavenger is incorporated is combined with a water-absorbing agent-incorporated resin layer.

An oxygen scavenger generally has a reducing property, and the oxygen scavenger catches oxygen while the oxygen scavenger per se is oxidized with oxygen. The presence of water is indispensable for this oxidation, that is, for catching oxygen. In the present invention, the highly moisture-absorbing property generally possessed by an oxygen barrier resin is skillfully utilized, and water caught in this oxygen barrier resin by absorption of the moisture is effectively utilized for promoting the oxidation of the oxygen scavenger.

In this case, as shown in the third and fourth embodiments of the present invention, if a water-absorbing agent is made present in the oxygen barrier resin or in the vicinity of the oxygen barrier resin layer as well as the oxygen scavenger, permeation of oxygen can be substantially completely intercepted under heat sterilization conditions.

In the plastic multi-layer vessel of the present invention, it is the gas barrier resin layer that is useful for preventing the permeation of oxygen, that is, for intercepting oxygen, in the normal state. Under conditions where water and heat simultaneously act, such as heat sterilization conditions, the oxygen scavenger present in the gas barrier resin acts effectively for intercepting oxygen. Thus, the function is appropriately allotted according to the state where the vessel is placed. Namely, as pointed out hereinbefore, under conditions where water and heat simultaneously act, permeation of water through the moisture-resistant resin layer becomes conspicuous, and the inherent oxygen barrier property of the gas barrier resin is reduced by absorption of the moisture or elevation of the temperature. However, the oxygen scavenger is activated by absorbed water and given heat, and oxygen is effectively caught by the oxygen scavenger, with the result that the permeation of oxygen is controlled even at the heat sterilization. Formation of a water-absorbing agent-containing resin is effective for preventing reduction of the oxygen barrier property of the gas barrier resin by absorbing water at the heat sterilization. This effect is due mainly to the control of the permeation of oxygen during the storage after the sterilization, and no effect is attained against the increase of the permeation quantity of oxygen by elevation of the temperature during the sterilization. On the other hand, in the case where the oxygen scavenger is incorporated in the gas barrier thermoplastic resin, a prominent effect of controlling the increase of the permeation quantity of oxygen by elevation of the temperature during the sterilization is attained and the permeation of oxygen during the storage after the sterilization is effectively controlled, but the influence by absorption of the moisture is observed. Accordingly, by making both of the oxygen scavenger and the water-absorbing agent present in the vessel wall, the permeation of oxygen can be controlled to a much lower level.

In view of the object of use of the gas barrier resin, it is indispensable that the gas barrier resin used in the present invention should have an oxygen permeation coefficient smaller than $10^{-12}$ cc.cm/cm$^2$.sec.cmHg, especially smaller than $5 \times 10^{-13}$ cc.cm/cm$^2$.sec.cmHg, as measured at a temperature of 20° C. and a relative humidity of 0%. Furthermore, this gas barrier resin should have a water absorption larger than 0.5%, especially larger than 1.0%, as measured at a temperature of 20° C. and a relative humidity of 100%. If the water absorption is too small and below the abovementioned range, the oxygen-catching property of the oxygen scavenger tends to decrease.

In the layer of the oxygen scavenger-incorporated gas barrier resin composition used in the present invention, when the water content in this layer is high or the temperature is high, oxygen is effectively intercepted by the oxygen scavenger, and when the water content or the temperature is low, the oxygen-intercepting action of the gas barrier resin is exerted.

In the plastic multi-layer vessels according to the first and second embodiments of the present invention, at least two intermediate layers can be used.

According to the second embodiment of the present invention, a plurality of function-separated layers are used as the intermediate layer. Namely, one intermediate resin layer is composed of a gas barrier resin having the above-mentioned oxygen permeation coefficient and the other intermediate layer is composed of a moisture-absorbing resin having the above-mentioned water absorption, and the oxygen scavenger is incorporated in the latter intermediate layer.

In this case, a plurality of oxygen barrier resin layers are formed and the oxygen scavenger is incorporated in one layer and of course, the oxygen scavenger-free oxygen barrier resin layer is formed as the other oxygen barrier resin layer.

In the case where not only the oxygen scavenger but also the water-absorbing agent is incorporated, in view of the simplicity of the layer structure, it is preferred that both of the oxygen scavenger and the water-absorbing agent be incorporated in the gas barrier resin as in the third embodiment, but in order to control the quantity of oxygen in the vessel to a lowest level at the heat sterilization and throughout the subsequent stage, it is preferred that the oxygen scavenger be incorporated in to the moisture-absorbing gas barrier resin layer and the water-absorbing agent-incorporated resin layer be formed adjacently thereto, as in the fourth embodiment.

Referring to FIG. 1 illustrating an example of the multi-layer structure of the vessel according to the first embodiment of the present invention, this vessel wall 1 comprises an oxygen scavenger-incorporated gas barrier resin intermediate layer 2 and moisture-resistant inner and outer layers 4 and 5 arranged on both the sides of the intermediate layer 2, if necessary through adhesive layers 3a and 3b.

Figure 2:
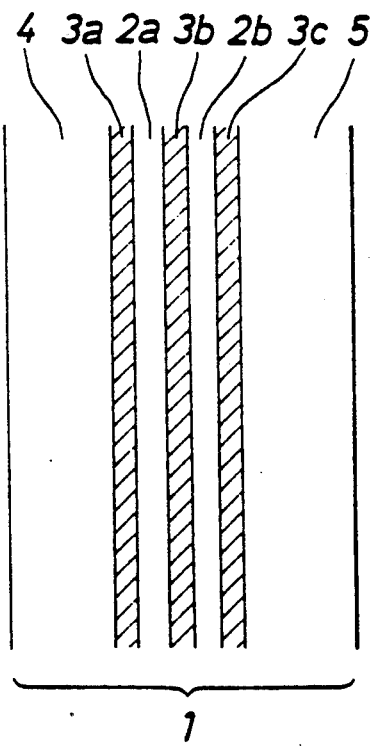

Referring to FIG. 2 illustrating an example of the multi-layer structure of the vessel according to the second embodiment of the present invention, this vessel wall 1 comprises a combination intermediate layer including an oxygen scavenger-free gas barrier resin layer 2a and an oxygen barrier-incorporated moisture-absorbing resin layer 2b, if necessary through an adhesive layer 3b, and moisture-resistant resin inner and outer layers 4 and 5 arranged on both the sides of this combination intermediate layer, if necessary through adhesive layers 3a and 3c.

Figure 3:
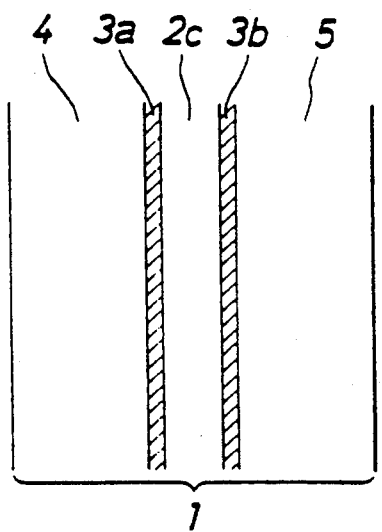

Referring to FIG. 3 illustrating an example of the multi-layer structure of the vessel according to the third embodiment of the present invention, this vessel wall 1 comprises an oxygen scavenger- and water-absorbing agent-incorporated gas barrier resin intermediate layer 2c and moisture-resistant resin inner and outer layers 4 and 5 arranged on both the sides of the intermediate layer 2c, if necessary through adhesive layer 3a and 3b.

Figure 4:
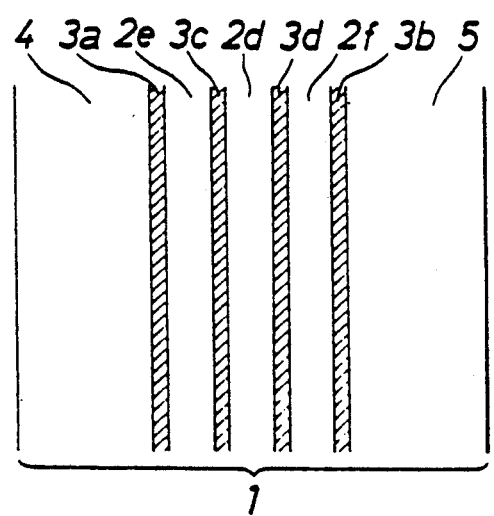
Figure 5:
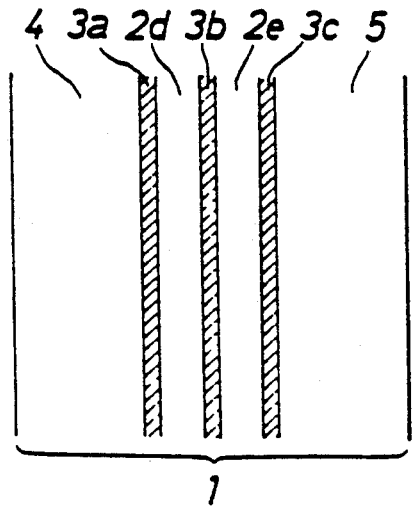

Referring to FIG. 4 illustrating an example of the multi-layer structure of the vessel according to the fourth embodiment of the present invention, this vessel wall 1 comprises a composite intermediate layer including an oxygen scavenger-incorporated gas barrier resin layer 2d and water-absorbing agent-incorporated thermoplastic resin layers 2e and 2f arranged on both the sides of the layer 2d, if necessary through adhesive layers 3c and 3d, and moisture-resistant resin inner and outer layers 4 and 5 arranged on both the sides of the composite intermediate layer, if necessary through adhesive layers 3a and 3b. A water-absorbing agent-incorporated thermoplastic resin layer 2e may be arranged only on one side, as shown in FIG. 5. In this case, it is preferred that the oxygen scavenger-incorporated resin layer 2d be located on a more inner side of the vessel than the water-adsorbing agent-incorporated resin layer 2e. Adhesive layers 3a, 3b and 3c are formed according to need.

OXYGEN SCAVENGER

All of oxygen scavengers customarily used in this field can be used as the oxygen scavenger in the present invention. In general, an oxygen scavenger having a reducing property and being substantially insoluble in water is preferably used. For example, an oxygen scavenger comprising as the main component at least one member selected from the group consisting of metal powders having a reducing property, such as reducing iron powder, reducing zinc powder and reducing tin powder, low-valence metal oxides such as ferrous oxide and triiron tetroxide, and reducing metal compounds such as iron carbide, iron silicide, iron carbonyl and iron hydroxide. The oxygen scavenger can be used in combination with an assistant such as a hydroxide, carbonate, sulfite, thosulfate, tertiary phosphate, secondary phosphate, organic acid salt or halide of an alkali metal or alkaline earth metal, or active carbon, active alumina or activated clay according to need.

Furthermore, a high-molecular-weight compound having a polyhydric phenol in the skeleton, such as a polyhydric phenol-containing phenol/aldehyde resin, can be used as the oxygen scavenger. In general, it si preferred that the oxygen scavenger should have an average particle size smaller than 100 $\mu$m, especially smaller than 50 $\mu$m.

WATER-ABSORBING AGENT

A deliquescent inorganic salt, a deliquescent organic compound or a highly water-absorbing resin is used as the water-absorbing agent. As examples of the deliquescent substance, there can be mentioned inorganic salts such as sodium chloride, calcium chloride, zinc chloride, ammonium chloride, ammonium sulfate, sodium sulfate, magnesium sulfate, disodium hydrogenphosphate, sodium dihydrogenphosphate, potassium carbonate and sodium nitrate, and organic compounds such as glucose, fructose, sucrose, gelatin, modified casein, modified starch and tragacanth gum. By the highly water-absorbing resin is meant a resin which is substantially water-insoluble and has an ability to absorb water in an amount scores of times to several hundred times the weight of the resin. In general, the highly water-absorbing resin has an ionizing group making a contribution to manifestation of the water-absorbing property and having a network or crosslinked structure or a gelatinous structure, which renders the resin water-insoluble.

As the highly water-absorbing resin, there are known grafted derivatives of the starch and cellulose type such as acrylic acid (salt)-grafted starch, acrylonitrile-grafted and hydrolyzed starch and acrylic acid (salt)-grafted cellulose, crosslinked polyacrylic acid (salt), especially a copolymer of acrylic acid (salt) with a polyfunctional monomer such as divinylbenzene optionally with a hydrophobic monomer such as styrene or an acrylic ester, a vinyl alcohol/acrylic acid (salt) block copolymer formed by saponifying a vinyl acetate/acrylic acid ester copolymer, and modified polyvinyl alcohol formed by reacting polyvinyl alcohol with an acid anhydride such as maleic anhydride or phthalic anhydride to introduce a carboxyl group and a crosslinked structure in the side chain. In these resins, the starch, cellulose or polyvinyl alcohol component exerts a function of insolubilizing the polyacrylic acid component and maintaining a gelatinous state. Furthermore, modified polyethylene oxide exerting a water-absorbing property according to a mechanism different from that of the above-mentioned water-absorbing resins is known. All of the foregoing highly water-absorbing resins can be used, but crosslinked polyacrylic acid (salt) is especially preferably used. This resin is marketed under the tradename of "Aquakeep 4S" or "Aquakeep 10SH" by Seitetsu Kagaku. As another suitable examples, there can be mentioned a vinyl alcohol/acrylic acid (salt) block copolymer and modified polyethylene oxide, and they are marketed under the tradenames of "Sumika Gel S Type" and "Sumica Gel R Type" by Sumitomo Kagaku.

Still further, silica gel, alumina gel, silica-alumina gel and various zeolites can be used as the water-absorbing agent.

GAS BARRIER RESIN

A heat-moldable thermoplastic resin having the above-mentioned oxygen permeation coefficient and moisture-absorbing property is used as the gas barrier resin. An ethylene/vinyl alcohol copolymer is most preferable as the gas barrier resin. For example, a saponified copolymer obtained by saponifying an ethylene/vinyl acetate copolymer having an ethylene content of 20 to 60 mole %, especially 25 to 50 mole %, to such an extent that the saponification degree is at least 96 mole %, especially at least 99 mole %, is used. This saponified copolymer should have a film-forming molecular weight, and it is generally preferred that the saponified copolymer should have a viscosity of at least 0.01 dl/g, especially at least 0.05 dl/g, as measured at 30° C. in a phenol/water mixed solvent having a phenol/water weight ratio of 85/15.

As another examples of the gas barrier resin having the above-mentioned properties, there can be mentioned polyamides having 5 to 50 amide groups, especially 6 to 20 amide groups, per 100 carbon atoms, such as nylon 6, nylon 6,6; a nylon 6/6,6 copolymer, poly-m-xylylene adipamide, nylon 6, 10, nylon 11, nylon 12 and nylon 13. Also these polyamides should have a film-forming molecular weight. It is preferred that the relative viscosity ($\eta$rel) as measured at a temperature of 30° C. and a concentration of 1.0 g/dl in concentrated sulfuric acid be at least 1.1, especially at least 1.5.

It is preferred that the oxygen scavenger be used at a concentration of 1 to 1000% by weight, especially 5 to 200% by weight, based on the gas barrier resin. If the amount of the oxygen scavenger is too small and below the above-mentioned range, the permeation quantity of oxygen at the heat sterilization is often larger than in the case where the amount of the oxygen scavenger is within the above-mentioned range. If the amount of the oxygen scavenger is too large and exceeds the above-mentioned range, the permeation quantity of oxygen in the normal state is often larger than in the case where the amount of the oxygen scavenger is within the above-mentioned range. It is preferred that the water-absorbing agent used in the third and fourth embodiment of the present invention be incorporated at a concentration of 1 to 300% by weight, especially 5 to 100% by weight, based on the gas barrier resin. If the content of the water-absorbing agent is too low and below the above-mentioned range, the gas barrier property during the storage after the heat sterilization is degraded as compared with the gas barrier property attained when the amount of the water-absorbing agent is within the above-mentioned range. If the amount of the water-absorbing agent is too large and exceeds the above-mentioned range, the permeation quantity of oxygen in the normal state is often larger than in the case where the amount of the water-absorbing agent is within the above-mentioned range.

It is preferred that the thickness of the oxygen scavenger-incorporated gas barrier resin layer be 5 to 200 $\mu$m, especially to 10 to 120 $\mu$m, though the preferable thickness differs to some extent according to the allowable oxygen amount in the vessel. In the third and fourth embodiments, it is preferred that the thickness of the water-absorbing agent-incorporated thermoplastic resin layer be 5 to 200 $\mu$m, especially 10 to 120 $\mu$m, though the preferable thickness differs to some extent according to the permeation quantity of water vapor.

In the case where the oxygen scavenger-free gas barrier resin intermediate layer and the oxygen scavenger-incorporated moisture-absorbing resin intermediate layer are used in combination (second embodiment), the oxygen scavenger-free gas barrier resin layer may be a layer of a moisture-absorbing gas barrier resin as mentioned above, or a lowly moisture-absorbing, gas barrier resin such as a vinylidene chloride copolymer resin, a high-nitrile resin or a gas barrier polyester resin. Of course, the moisture-absorbing resin in which the oxygen scavenger in incorporated may be a known resin having a gas barrier property, such as a moisture-absorbing gas barrier resin as mentioned above. Other moisture-absorbing thermoplastic resins such as polyacrylic acid, polymethacrylic acid, polyacrylamide, polyvinyl pyrrolidone, polyvinylmethyl ether and a vinyl alcohol/acrylic acid copolymer can be used. The amount of the oxygen scavenger incorporated in the moisture-absorbing resin may be within the range mentioned above with respect to the gas barrier resin. It is preferred that the total thickness of both the resin layers be within the above-mentioned thickness range and the thickness ratio of the oxygen scavenger-incorporated resin layer to the oxygen scavenger-free resin layer be in the range of from 95/5 to 5/95, especially from 75/25 to 25/75.

In the present invention, in the case where the oxygen scavenger is incorporated in the moisture-absorbing gas barrier resin and the water-absorbing agent-incorporated resin layer is arranged adjacently to the above resin layer (fourth embodiment), the thermoplastic resin in which the water-absorbing agent is incorporated can be gas barrier resin as mentioned above, a moisture-resistant resin, an adhesive resin or a blend thereof, or other thermoplastic resin. The gas barrier resin layer in which the water-absorbing agent is incorporated can be, for example, a layer of a moisture-absorbing gas barrier resin as mentioned above. It will be understood that the water-absorbing agent can be incorporated into the moisture-resistant resin or adhesive resin.

The amount of the water-absorbing agent incorporated into the resin may be within the range mentioned above with respect to the gas barrier resin. It is generally preferred that the thickness ratio of the oxygen scavenger-incorporated resin layer to the water-absorbing agent-incorporated resin layer be within the range of from 5/95 to 95/5, especially from 25/75 to 5/25.

MOISTURE-RESISTANT RESIN

As the moisture-resistant resin (lowly water-absorbing resin), there is used a thermoplastic resin having a water absorption smaller than 0.5%, especially smaller than 0.01%, as measured according to ASTM D-570. As typical examples, there can be mentioned olefin resins such as low-density polyethylene, medium-density polyethylene, high-density polyethylene, isotactic polypropylene, an ethylene/propylene copolymer, polybutene-1, an ethylene/butene-1 copolymer, a propylene/butene-1 copolymer, an ethylene/propylene/ butene-1 copolymer, an ethylene/vinyl acetate copolymer, an ion-crosslinked olefin copolymer (ionomer) and blends thereof, styrene type resins such as polystyrene, a styrene/butadiene copolymer, a styrene/isoprene copolymer and an ABS resin, thermoplastic polyesters such as polyethylene terephthalate and polytetramethylene terephthalate, and polycarbonates.

In the multi-layer structure of the present invention, it is preferred that the thickness of the moisture-resistant resin layer be 20 to 3000 μm, especially 100 to 1500 μm, and be 0.1 to 600 times, especially 1 to 150 times, the thickness of the intermediate layer. The thickness of the inner layer may be equal to the thickness of the outer layer, or the thickness of one of the inner and outer layers may be larger than the thickness of the other layer.

ADHESIVE RESIN

It sometimes happens that sufficient adhesiveness cannot be obtained between the gas barrier and the moisture-resistant thermoplastic resin, as in the case where an ethylene/vinyl alcohol copolymer is used. In this case, an adhesive resin layer is interposed between both the resin layers.

As the adhesive resin, there can be mentioned a thermoplastic resin containing a carbonyl group (—C—) derived from a carboxylic acid, a carboxylic anhydride, a carboxylic acid salt, a carboxylic acid amide or a carboxylic acid ester in the main chain or side chain at a concentration of 1 to 700 meq/100 g of the resin, especially 10 to 500 meq/100 g of the resin. As appropriate examples of the adhesive resin, there can be mentioned an ethylene/acrylic acid copolymer, an ion-crosslinked olefin copolymer, maleic anhydride-grafted polyethylene, maleic anhydride-grafted polypropylene, an acrylic acid-grafted polyolefin, an ethylene/vinyl acetate copolymer, a copolyester and a copolyamide. These adhesive resins can be used singly or in the form of a mixture of two or more of them. The adhesive resin is valuably laminated by co-extrusion or sandwich lamination. For the adhesive lamination of preliminarily formed films of the gas barrier resin and moisture-resistant film, an isocyanate type or epoxy type thermosetting adhesive resin can be used.

PREPARATION PROCESS

The vessel of the present invention can be prepared according to a known process except that the above-mentioned specific layer structure is formed.

In case of the multi-layer co-extrusion, melt kneading is carried out in extruders corresponding to the respective resin layers, and melts are extruded in a predetermined shape through a multi-layer multi-ply die such as a T-die or a circular die. Furthermore, melting kneading is carried out in injection machines corresponding to the respective resin layers and co-injection or sequential injection into an injection mole is carried out to form a multi-layer vessel or a preform for a multi-layer vessel. Alternatively, there can be adopted a lamination process such as dry lamination, sandwich lamination or extrusion coating. The molded body can take a form of a film, a sheet, a bottle- or tube-forming parison or pipe, or a bottle- or tube-forming preform. Formation of a bottle from a parison, pipe or preform can be easily accomplished by pinching off the extrudate by a pair of split molds and blowing a fluid into interior of the molded body. Furthermore, a draw-blow-formed bottle can be obtained by a pipe or preform, heating the pipe or preform at a drawing temperature, drawing the pipe or preform in the axial direction and simultaneously, blow-drawing the pipe or parison in the circumferential direction by a fluid pressure. Moreover, a cup-shaped or tray-shaped packaging vessel can be obtained by subjecting a film or sheet to such a forming operation as vacuum forming, compressed air forming, stretch forming or plug assist forming.

A multi-layer film can be formed into a bag-shaped vessel by piling or folding the multi-layer film in the form of a bag and heat-sealing the periphery.

EFFECT OF THE INVENTION

According to the present invention, by incorporating an oxygen scavenger into a moisture-absorbing oxygen barrier resin intermediate layer sandwiched between moisture-resistant inner and outer layers or into a moisture-absorbing resin which is used as the intermediate layer in combination with an oxygen barrier resin, or by incorporating an oxygen scavenger and a water-absorbing agent into a moisture-absorbing gas barrier resin layer, or by incorporating an oxygen scavenger into a moisture-absorbing gas barrier resin layer and arranging a water-absorbing agent-containing resin layer adjacently to the gas barrier resin layer, even under conditions where water and heat simultaneously act and the inherent oxygen barrier property of the oxygen garrier resin, for example, under heat sterilization conditions, the oxygen scavenger activated by heat and water supplied by absorption of the permeate through the vessel wall and prevents the permeation of oxygen, and with the lapse of time after the exposure to such conditions, the permeation of oxygen can be controlled to a very low level.

EXAMPLE

EXAMPLE 1

A pellet of an ethylene/vinyl alcohol copolymer (having an ethylene content of 32 mole % and a saponification degree of 99.6 mole) having an oxygen permeation coefficient of $4 \times 10^{-14}$ cc.cm/cm$^2$.sec.cmHg as measured at a temperature of 20° C. and a relative humidity of 0% and a water absorption of 4.8% as measured at a temperature of 20° C. and a relative humidity of 100% was mixed with an iron type oxygen scavenger having an average particle size of 40 μm by a batchwise high-speed stirring vane type mixer (Henschel mixer). The mixing ratio was such that the content of the oxygen scavenger was 7% by weight. The mixture was pelletized by a pelletizer comprising an extruder having a screw having a diameter of 50 μm, a strand die, a blower cooling tank and a cutter. A symmetric three-resin five-layer sheet comprising the pelletized mixture (EO) of the ethylene/ vinyl alcohol copolymer and oxygen scavenger as the intermediate layer, polypropylene (PP) having a melt index of 0.5 g/10 min (230° C.) as the inner and outer layers and maleic anhydride-modified PP (ADH) having a melt index of 1.0 g/10 min as the adhesive layers was formed by a multi-layer sheet-forming machine comprising a 50 mm-diameter extruder for the inner and outer layers, a 32 mm-diameter extruder for the adhesive layers, a 32 mm-diameter extruder for the intermediate layer, a feed block, a T-die, a cooling roll and a sheet takeup device. (In the multi-layer sheet, the total thickness was 0.9 mm and the PP/ADH/EO/ADH/PP thickness ratio was 12/1/2/1/12.) The obtained three-resin five-layer sheet was heated at about 190° C. and formed into a cup-shaped vessel having a height of 50 mm, an opening diameter of 100 mm and an inner volume of 117 ml by using a vacuum-forming machine. In a nitrogen atmosphere, the cup was filled with 2 ml of distilled water and heat-sealed with an aluminum foil/PP sealing material. The vessel was subjected to the sterilization at 120° C. for 30 minutes and then stored at a temperature of 20° C. and a relative humidity of 60%. After the lapse of a predetermined period, the oxygen concentration in the vessel was measured by a gas chromatograph apparatus (GC). For comparison, forming, filling, sealing and heat sterilization were carried out in the same manner as described above except that the oxygen scavenger was not incorporated into the ethylene/vinyl alcohol copolymer. The measurement was carried out also with respect to the obtained comparative cup. The obtained results are shown in Table 1. It is seen that the oxygen scavenger-incorporated product of the present invention had a prominent effect and the permeation quantity of oxygen was smaller than ⅓ the permeation quantity of oxygen in the comparative product.

EXAMPLE 2

Polypropylene (PP) having an oxygen permeation coefficient larger than $5 \times 10^{-11}$ cc.cm/cm$^2$.sec.cmHg as measured at a temperature of 20° C. and a relative humidity of 0%, a water absorption smaller than 0.5% as measured at a temperature of 20° C. and relative humidity of 100% and a melt index (MI) of 0.5 g/10 min (230° C.) was mixed with an iron type oxygen scavenger having an average particle size of 40 μm by a batchwise high-speed stirring vane type mixer (Henschel mixer) so that the content of the oxygen scavenger was 2% by weight. The mixture was pelletized by the pelletizer used in Example 1. A symmetric three-resin five-layer sheet comprising the pelletized oxygen scavenger-incorporated PP (PPO) as the inner and outer layers, an ethylene/vinyl alcohol copolymer (E) (having an ethylene content of 32 mole % and a saponification degree of 99.6 mole %) as the intermediate layer and the same maleic anhydride-modified PP (ADH) as used in Example 1 as the adhesive layer was formed by the multi-layer sheet-forming machine used in Example 1. (In the obtained multi-layer sheet, the total thickness was 0.9 mm and the PPO/ADH/E/ADH/PPO thickness ratio was 12/1/2/1/12.) The multi-layer sheet was formed in a cup-shaped vessel in the same manner as described in Example 1.

In the same manner as described in Example 1, the vessel was filed with 2 ml of distilled water in a nitrogen atmosphere, sealed and subjected to the heat sterilization, and after the lapse of a certain period, the amount of oxygen in the vessel was measured by a gas chromatograph apparatus. For comparison, a cup was formed and used in the same manner as described above except that oxygen scavenger-free PP was used for the inner and outer layers. The obtained results are shown in Table 1. It is seen that when the oxygen scavenger was incorporated in PP, the effect was not so prominent as the effect attained in Example 1.

EXAMPLE 3

A mixture of a pellet of a nylon 6/nylon 6,10 copolymer (Novamid 2030 supplied by Mitsubishi Kasei) having an oxygen permeation coefficient of $6 \times 10^{-12}$ cc.cm/cm$^2$.sec.cmHg as measured at a temperature of 20° C. and a relative humidity of 0% and a water absorption of 8.1% as measured at a temperature of 20° C. and relative humidity of 100% and a iron type oxygen scavenger having an average particle size of 40 μm was pellerized in the same manner as described in Example 1, and by using PP, ADH and the oxygen scavenger-incorporated nylon (NO), a symmetric three-resin five-layer sheet (the total thickness was 0.9 mm and the PP/ADH/NO/ADH/PP thickness ratio was 12/1/2/1/12) was prepared in the same manner as described in Example 1. Then, in the same manner as described in Example 1, a cup-shaped vessel formed from the sheet was filled with 2 ml of distilled water in a nitrogen atmosphere sealed and subjected to the heat sterilization, and at predetermined time intervals, the change of the oxygen concentration in the vessel was determined by GC. For comparison, the test was carried out in the same manner by using the oxygen scavenger-free nylon. The obtained results are shown in Table 1. It is seen that when the oxygen scavenger-incorporated nylon resin was used, a prominent effect was attained and the quantity of oxygen permeating through the vessel wall was reduced to about 1/3 of the permeation quantity in the comparative product.

EXAMPLE 4

A mixture of a pellet of an ethylene/vinyl alcohol copolymer (having an ethylene content of 32 mole % and a saponification degree of 99.6 mole %) having an oxygen permeation coefficient of $4 \times 10^{-14}$ cc.cm/cm$^2$.sec.cmHg as measured at a temperature of 20° C. and a relative humidity of 0% and water absorption of 4.8% as measured at a temperature of 20° C. and a relative humidity of 100% and a phenol/aldehyde resin having a polyhydric phenol in the skeleton, which was synthesized in the following manner, was pelletized in the same manner as described in Example 1 so that the content of the phonol/aldehyde resin was 20% by weight. Then, in the same manner as described, sheet forming, cup forming, filling, sealing and heat sterilization were conducted, and at predetermined time intervals, the oxygen concentration in the vessel was measured by GC. The obtained results are shown in Table 1. For comparison, a cup similarly prepared without incorporating the phenol/aldehyde resin having the polyhydric phenol skeleton was tested in the same manner as described above. (Phenol/aldehyde resin having polyhydric phenol in skeleton)

In the presence of an acid catalyst, 1 mole of methylhydroquinone was reacted with 238 g of a 37% aqueous solution of formaldehyde at 80° C. for 1 hour in an N$_2$ current, and the reaction mixture was poured into warm water stirred at a high speed to obtain a powder of the above-mentioned resin.

The oxygen permeability of the vessel formed according to the present invention was reduced to about ½ of that of the comparative vessel, and a prominent effect was attained according to the present invention.

EXAMPLE 5

In the same manner as described in Example 1, a three-resin five-layer sheet comprising the ethylene/vinyl alcohol copolymer-iron type oxygen scavenger mixture (EO) pelletized by the method of Example 1 as the intermediate layer, a boiling water-resistant polycarbonate resin (PC; Panelyte K-1300 supplied by Teijin Kasei) as the inner and outer layers and maleic anhydride-modified PP (ADH; Admer 5050) as the adhesive layers was formed into a cup, and the cup was filled, sealed and subjected to the heat sterilization. At predetermined time intervals, the oxygen concentration in the vessel was measured by GC. A cup prepared in the same manner by using oxygen scavenger-free PET was used as the comparative product. The obtained results are shown in Table 1. The product of the present invention had a prominent effect, as compared with the comparative product.

EXAMPLE 6

In the same manner as described in Example 1, a four-resin seven-layer sheet was prepared by using the ethylene/vinyl alcohol copolymer (E) used in Example 1 as the first intermediate layer, a water-absorbing thermoplastic resin (Plawet supplied by Mitsubishi Kasei) containing 7% by weight of an iron type oxygen scavenger incorporated therein (WO) as second intermediate layer, PP having MI of 0.5 g/10 min (230° C.) as the inner and outer layers and maleic anhydride-modified PP (ADH) as the adhesive layers. (In the obtained sheet, the total thickness was 0.9 mm and the PP/ADH/E/ADH/WO/ADH/PP thickness ratio was 12/1/1/1/1/1/ 12.) Then, in the same manner as described in Example 1, cup forming, filling, sealing and heat sterilization were carried out. At predetermined time intervals, the oxygen concentration in the vessel was measured. A vessel having the same structure, which was prepared without incorporation of the oxygen scavenger, was used as the comparative product. The product of the present invention showed a prominent effect over the comparative product.

sorption of 4.8% as measured at a temperature of 20° C. and a relative humidity of 100% (having an ethylene content of 32 mole % and a saponification degree of 99.6 mole %) was mixed with an iron type oxygen scavenger having an average particle size of 40 μm and disodium hydrogenphosphate as the water-absorbing agent by a batchwise high-speed stirring vane mixer (Henschel mixer) so that the oxygen scavenger content was 30% by weight and the disodium hydrogenphosphate content was 20% by weight. The mixture was pelletized by a pelletizer comprising an extruder having a screw having a diameter of 50 mm, a strand die, a blower cooling tank and a cutter. A symmetric three-resin five-layer sheet comprising an intermediate layer of the above-mentioned pelletized mixture (EOD) of the ethylene/vinyl alcohol copolymer with the oxygen scavenger and disodium hydrogenphosphate, inner and outer layers of polypropylene (PP) having a melt index (MI) of 0.5 g/10 min (230° C.) and adhesive layers of maleic anhydride-modified PP (ADH) having a melt index of 1.0 g/10 min (the total thickness was 0.9 mm and the PP/ADH/EOD/ADH/PP thickness ratio was 12/1/2/1/12) was formed by a multi-layer sheet-forming machine comprising a 50 mm-diameter extruder for the inner and outer layers, a 32 mm-diameter extruder for the adhesive layers, a 32 mm-diameter extruder for the intermediate layer, a feed block, a T-die, a cooling roll and a sheet take-up device. The obtained three-resin five-layer sheet was heated at about 190° C. and formed into a cup-shaped vessel having a height of 15 mm, an opening diameter of 100 mm and an inner volume of 117 ml by a vacuum forming machine. In a nitrogen atmosphere, the cup was filled with 2 ml of distilled water, heat-sealed with an aluminum foil/PP sealing material and subjected to the heat sterilization at 120° C. for 30 minutes. After the sterilization, the cup was stored at a temperature of 20° C. and a relative humidity of 60%, and after the lapse of a predetermined period, the oxy-

TABLE 1

| Example No. | | Test Results (oxygen concentration, %, in vessel) | | | | |
|---|---|---|---|---|---|---|
| | | Initial Oxygen Concentration | Just After Heat Sterilization | After 1 Month | After 2 Months | After 3 Months |
| 1 | product of present invention | 0.01 | 0.21 | 1.10 | 1.41 | 1.60 |
| | comparative product | 0.01 | 0.55 | 3.80 | 4.73 | 5.20 |
| 2 | test product | 0.01 | 0.46 | 3.30 | 4.00 | 4.43 |
| | comparative product | 0.01 | 0.55 | 3.80 | 4.73 | 5.20 |
| 3 | product of present invention | 0.01 | 0.27 | 1.21 | 1.73 | 1.80 |
| | comparative product | 0.01 | 0.61 | 3.92 | 4.99 | 5.52 |
| 4 | product of present invention | 0.01 | 0.31 | 1.85 | 2.25 | 2.61 |
| | comparative product | 0.01 | 0.55 | 3.80 | 4.73 | 5.20 |
| 5 | product of present invention | 0.01 | 0.22 | 1.12 | 1.45 | 1.65 |
| | comparative product | 0.01 | 0.57 | 3.90 | 4.76 | 5.31 |
| 6 | product of present invention | 0.01 | 0.36 | 1.57 | 1.98 | 2.35 |
| | comparative product | 0.01 | 0.90 | 4.89 | 5.81 | 6.22 |

EXAMPLE 7

A pellet of an ethylene/vinyl alcohol copolymer having an oxygen permeation coefficient of $4 \times 10^{-14}$ cc. cm/cm$^2$.sec.cmHg as measured at a temperature of 20° C. and a relative humidity of 0% and a water abgen concentration in the vessel was measured by a gas chromatograph apparatus (GC). A cup prepared in the same manner through forming, filling, sealing and heat sterilization without incorporating the oxygen scavenger and water-absorbing agent in the ethylene/vinyl alcohol was used as the comparative product, and the measurement was carried out in the same manner with respect to this comparative product. The obtained results are shown in Table 2. In the product of the present invention, the permeation quantity of oxygen could be controlled to a very low level during the heat sterilization and the subsequent storage.

EXAMPLE 8

In the same manner as described in Example 7, an ethylene/vinyl alcohol copolymer having an oxygen permeation coefficient of $4 \times 10^{-14}$ cc.cm/cm$^2$.sec.cmHg as measured at a temperature of 20° C. and a relative humidity of 0% and a water absorption of 4.8% as measured at a temperature of 20° C. and a relative humidity of 100% (having an ethylene content of 32 mole % and a saponification degree of 99.6 mole %) was mixed and pelletized with an iron type oxygen scavenger having an average particle size of 40 μm. Then, PP having MI of 0.5 g/10 min (230° C.) was similarly mixed and pelletized with disodium hydrogenphosphate. In the same manner as described in Example 7, a four-resin six-layer sheet comprising a composite intermediate layer formed by bonding the oxygen scavenger-incorporated ethylene/ vinyl alcohol copolymer (EO) to the disodium hydrogenphosphate-incorporated PP (PDI) through maleic anhydride-modified PP (ADH) having MI of 1.0 g/10 min, inner and outer layers of PP having MI of 0.5 g/10 min (230° C.) and ADH as the adhesive between the intermediate layer and inner layer (the total thickness was 0.9 mm and the PP/ADH/EO/ADH/PDI/PP thickness ratio was 12/1/2/1/2/12) was formed. In the same manner as described in Example 7, the sheet was formed into a cup so that the EO layer was located on the more inner side than the PDI layer, and the cup was filled, sealed, heat-sterilized and stored. After the lapse of a predetermined period, the oxygen concentration in the vessel was measured by GC. A cup vessel having the same structure was prepared as the comparative product without incorporating the oxygen scavenger and disodium hydrogenphosphate and the measurement was similarly carried out. The obtained results are shown in Table 2. The product of the present invention showed a prominent effect just after the heat sterilization and during the subsequent storage, as compared with the comparative product.

EXAMPLE 9

A symmetric four-resin seven-layer sheet was prepared in the same manner as described in Example 7 by forming a composite intermediate layer of PDI/ADH/EO/ADH/PDI by using EO and PDI pelletized in the same manner as described in Example 8 and ADH as the adhesive layer and by using PP having MI of 0.5 g/10 min (230° C.) as the inner and outer layers. (In the formed sheet, the total thickness was 1.0 mm and the PP/PDI/ADH/EO/ADH/PDI/PP thickness ratio was 12/2/1/2/1/2/12.) Then, in the same manner as described in Example 7, the sheet was formed into a cup and the cup was filled, sealed, heat-sterilized and stored. At predetermined time intervals, the oxygen concentration in the vessel was measured by GC. A vessel of the same structure prepared without using the oxygen scavenger and disodium hydrogenphosphate was used as the comparative product. The obtained results are shown in Table 2.

EXAMPLE 10

In the same manner as described in Example 8, a cup-shaped vessel was prepared by using the phenol/aldehyde resin having a polyhydric phenol in the skeleton, which was prepared in Example 4, as the oxygen scavenger and sodium dihydrogenphosphate as the water-absorbing agent. At this step, care was taken so that the oxygen scavenger-incorporated resin layer was located on the more inner side than the water-absorbing agent-incorporated resin layer. In the same manner as described in Example 7, filling, sealing, heat sterilization and storing were conducted, and after the lapse of a predetermined period, the oxygen concentration in the vessel was measured by GC. A vessel of the same structure prepared without incorporating the oxygen scavenger and water-absorbing agent was used as the comparative product. The obtained results are shown in Table 2.

EXAMPLE 11

A pellet of a nylon 6/nylon 6,6 copolymer (Novamid supplied by Mitsubishi Kasei) having an oxygen permeation coefficient of $6 \times 10^{-13}$ cc.cm/cm$^2$.sec.cmHg as measured at a temperature of 20° C. and a relative humidity of 0% and a water absorption of 8.1% as measured at a temperature of 20° C. and a relative humidity of 100% was mixed and pelletized with an iron type oxygen scavenger having an average particle size of 40 μm in the same manner as described in Example 7. Then, PP having MI of 0.5 g/10 min (230° C.) was mixed and pelletized with sodium dihydrogenphosphate. A four-resin six-layer sheet as described in Example 2 was prepared by using the oxygen scavenger-incorporated nylon 6/nylon 6,6 copolymer (NO), the sodium dihydrogenphosphate-incorporated PP (PD2), and PP for the inner and outer layers and adhesive ADH, described in Example 7 (the total thickness was 0.9 mm and the PP/ADH/NO/ADH/PD2/PP thickness ratio was 12/1/2/1/2/12). Then, the sheet was formed into a cup-shaped vessel, and the cup was filled, sealed, heat-sterilized and stored.

At the cup-formed step, the operation was carried out so that the NO layer was located on the more inner side than the PD2 layer. At predetermined time intervals, the oxygen concentration in the vessel was measured by GC. The obtained results are shown in Table 2. A cup of the same structure prepared without incorporating the oxygen scavenger and sodium dihydrogenphosphate was used as the comparative product.

EXAMPLE 12

In the same manner as described in Example 7, a three-resin five-layer sheet was formed by using the mixture (EOD) of the ethylene/vinyl alcohol copolymer, iron type oxygen scavenger and water-absorbing agent, pelletized in the same manner as described in Example 7, as the intermediate layer, a boiling water-resistant polycarbonate resin (Panelite K-1300 supplied by Teijin Kasei) as the inner and outer layers and a maleic anhydride-modified PP adhesive (Admer 5050 supplied by Mitsui Petrochemical) as the adhesive layers. The sheet was formed into a cup, and the cup was filled, sealed, heat-sterilized and stored. At predetermined time intervals, the oxygen concentration in the vessel was measured by GC. A cup of the same structure prepared without incorporating the oxygen scavenger and water-absorbing agent was used as the comparative product. The obtained results are shown in Table 2.

TABLE 2

| Example No. | | Test Results (oxygen concentration. %. in vessel) | | | | |
|---|---|---|---|---|---|---|
| | | Initial Oxygen Concentration | Just After Heat Sterilization | After 1 Month | After 2 Months | After 3 Months |
| 7 | product of present invention | 0.01 | 0.24 | 0.34 | 0.40 | 0.44 |
| | comparative product | 0.01 | 0.55 | 3.80 | 4.73 | 5.20 |
| 8 | product of present invention | 0.01 | 0.19 | 0.25 | 0.30 | 0.33 |
| | comparative product | 0.01 | 0.62 | 3.95 | 4.91 | 5.48 |
| 9 | product of present invention | 0.01 | 0.21 | 0.30 | 0.36 | 0.40 |
| | comparative product | 0.01 | 0.63 | 3.99 | 4.95 | 5.51 |
| 10 | product of present invention | 0.01 | 0.38 | 0.47 | 0.52 | 0.57 |
| | comparative product | 0.01 | 0.62 | 3.95 | 4.91 | 5.48 |
| 11 | product of present invention | 0.01 | 0.34 | 0.46 | 0.50 | 0.55 |
| | comparative product | 0.01 | 0.66 | 4.07 | 5.10 | 5.79 |
| 12 | product of present invention | 0.01 | 0.30 | 0.39 | 0.43 | 0.50 |
| | comparative product | 0.01 | 0.70 | 4.08 | 5.18 | 5.87 |

What is claimed is:

1. A plastic multi-layer vessel having a coextruded laminate structure comprising
an intermediate layer of a resin composition formed by incorporating an oxygen scavenger into a gas barrier thermoplastic resin having an oxygen permeation coefficient smaller than $10^{-12}$ cc.cm/cm$^2$.sec.cmHg as measured at a temperature of 20° C. and a relative humidity of 0% and a water absorption larger than 0.5% as measured at a temperature of 20° C. and a relative humidity of 100%, said gas barrier thermoplastic resin being selected from the group consisting of an ethylene/vinyl alcohol copolymer having an ethylene content of 20 to 60 mole % and a polyamide having 5 to 50 amide groups per 100 carbon atoms of the polyamide, and
moisture resistant thermoplastic resin layers arranged on both sides of said intermediate layer.

2. A multi-layer plastic vessel as set forth in claim 1, wherein the oxygen scavenger is present in an amount of 1 to 1000% by weight based on the gas barrier thermoplastic resin.

3. A multi-layer plastic vessel as set forth in claim 1, wherein the gas barrier thermoplastic resin is an ethylene/vinyl alcohol copolymer having an ethylene content of 20 to 60 mole %.

4. A multi-layer plastic vessel as set forth in claim 1, wherein the gas barrier thermoplastic resin is a polyamide having 5 to 50 amide groups per 100 carbon atoms.

5. A multi-layer plastic vessel as set forth in claim 1, wherein the oxygen scavenger is a powder of a metal having a reducing property, a compound of a metal having a reducing property or a high-molecular-weight compound having a polyhydric phenol in the skeleton thereof.

6. A multi-layer plastic vessel as set forth in claim 1, wherein the moisture-resistant thermoplastic resin is an olefin resin, a styrene resin, a polycarbonate or a polyester.

7. A plastic multi-layer vessel having a coextruded laminate structure comprising
a first intermediate layer of a gas barrier thermoplastic resin having an oxygen permeation coefficient smaller than $10^{-12}$ cc.cm/cm$^2$.sec.cmHg as measured at a temperature of 20° C. and a relative humidity of 0%, said gas barrier thermoplastic resin being selected from the group consisting of an ethylene/vinyl alcohol copolymer having an ethylene content of 20 to 60 mole % and a polyamide having 5 to 50 amide groups per 100 carbon atoms in the polyamide,
a second intermediate layer of a resin composition formed by incorporating an oxygen scavenger into a moisture-absorbing thermoplastic resin having a water absorption larger than 0.5% as measured at a temperature of 20° C. and a relative humidity of 100%, and
moisture-resistant thermoplastic resin layers arranged on both sides of the intermediate layers.

8. A multi-layer plastic vessel as set forth in claim 7, wherein the oxygen scavenger is present in an amount of 1 to 1000% by weight based on the moisture-absorbing thermoplastic resin.

9. A multi-layer plastic vessel as set forth in claim 7, wherein the gas barrier thermoplastic resin is an ethylene/vinyl alcohol copolymer having an ethylene content of 20 to 60 mole %.

10. A multi-layer plastic vessel as set forth in claim 7, wherein the gas barrier thermoplastic resin is a polyamide having 5 to 50 amide groups per 100 carbon atoms.

11. A multi-layer plastic vessel as set forth in claim 7, wherein the oxygen scavenger is a powder of a metal having a reducing property, a compound of a metal having a reducing property or a high-molecular-weight compound having a polyhydric phenol in the skeleton thereof.

12. A multi-layer plastic vessel as set forth in claim 7, wherein the moisture-resistant thermoplastic resin is an olefin resin, a styrene resin, a polycarbonate or a polyester.

13. A plastic multi-layer vessel comprising (A) a layer of a resin composition formed by incorporating an oxygen scavenger into a gas barrier thermoplastic resin having an oxygen permeation coefficient smaller than $10^{-12}$ cc.cm/cm$^2$.sec.cmHg as measured at a temperature of 20° C. and a relative humidity of 0% and a water absorption larger than 0.5% as measured at a temperature of 20° C. and a relative humidity of 100%, said gas barrier thermoplastic resin being selected from the group consisting of an ethylene/vinyl alcohol copolymer having an ethylene content of 20 to 60 mole % and a polyamide having 5 to 50 amide groups per 100 carbon atoms in the polyamide, and (B) a layer of resin composition formed by incorporating a water-absorbing agent into a thermoplastic resin.

14. A multi-layer vessel as set forth in claim 13, wherein the oxygen scavenger is present in an amount of 1 to 1000% by weight based on the gas barrier thermoplastic resin and the water-absorbing agent is present in an amount of 1 to 300% by weight based on the thermoplastic resin.

15. A multi-layer vessel as set forth in claim 13, wherein the layer (B) of the resin composition is present on both the sides of the layer (A) of the resin composition.

16. A multi-layer vessel as set forth in claim 13, which has a multi-layer structure in which the layer (A) of the resin composition and the layer (B) of the resin composition are sandwiched between inner and outer layers of a moisture-resistant thermoplastic resin.

17. A multi-layer vessel as set forth in claim 13, wherein the gas barrier thermoplastic resin is an ethylene/vinyl alcohol copolymer having an ethylene content of 20 to 60 mole %.

18. A multi-layer vessel as set forth in claim 13, wherein the gas barrier thermoplastic resin is a polyamide having 5 to 50 amide groups per 100 carbon atoms.

19. A multi-layer vessel as set forth in claim 13, wherein the oxygen scavenger is a powder of a metal having a reducing property, a compound of a metal having a reducing property or a high-molecular-weight compound having a polyhydric phenol in the skeleton thereof.

20. A multi-layer vessel as set forth in claim 13, wherein the water-absorbing agent is a deliquescent inorganic salt or a highly water-absorbing resin.

21. A plastic multi-layer vessel having a co-extruded laminate which comprises (1) an intermediate layer composed of a resin composition formed by incorporating an oxygen scavenger and a water-absorbing agent into a gas barrier resin having an oxygen permeation coefficient smaller than $10^{-12}$ cc cm/cm$^2$ sec cmHg as measured at a temperature of 20° C. and a relative humidity of 0% and a water absorption larger than 0.5% as measured at a temperature of 20° C. and a relative humidity of 100%, said gas barrier resin being selected from the group consisting of an ethylene/vinyl alcohol copolymer having an ethylene content of 20 to 60 mole % and a polyamide having 5 to 20 amide groups per 100 carbon atoms, and (2) moisture-resistant thermoplastic resin layers arranged on both the sides of said intermediate layer.

22. A multi-layer vessel as set forth in claim 21, wherein the oxygen scavenger is present in an amount of 1 to 1000% by weight based on the gas barrier thermoplastic resin and the water-absorbing agent is present in an amount of 1 to 300% by weight based on the gas barrier thermoplastic resin.

23. A multi-layer vessel as set forth in claim 21, wherein the oxygen scavenger is a powder of a metal having a reducing property, a compound of a metal having a reducing property or a high-molecular-weight compound having a polyhydric phenol in the shelton thereof.

24. A multi-layer vessel as set forth in claim 21, wherein the water-absorbing agent is a deliquescent inorganic salt or a highly water-absorbing resin.

* * * * *